March 25, 1969

J. H. BURKHART 3,434,280

EXHAUST CHAMBER

Filed Nov. 20, 1967

INVENTOR.
JOE H. BURKHART
BY
Dunlap and Laney
ATTORNEYS

United States Patent Office 3,434,280
Patented Mar. 25, 1969

3,434,280
EXHAUST CHAMBER
Joe H. Burkhart, 1402 Manvel,
Chandler, Okla. 74834
Filed Nov. 20, 1967, Ser. No. 684,304
Int. Cl. F02b 27/00
U.S. Cl. 60—32       8 Claims

ABSTRACT OF THE DISCLOSURE

Apparatus for providing optimum exhaust control for a two-stroke cycle engine, the apparatus comprising an inlet pipe for receiving the engine exhaust output and for directing it into an expansion chamber having predetermined internal configuration and adjustable volume and baffle spacing. The expansion chamber is formed as a volume providing uniform expansion and baffling of exhaust gases, the volume containing a centrally-located pulsating portion having uniform cross-section and being adjustable as to its axial length.

BACKGROUND OF THE INVENTION

Field of the invention

The invention relates generally to exhaust systems, and, more particularly, but not by way of limitation, it relates to adjustable expansion chamber apparatus for use with two-stroke cycle engines.

Description of the prior art

The prior art includes various types of exhaust systems for use both with four-stroke cycle engines and two-stroke cycle engines. The prior teachings set forth an awareness of the criticality of exhaust systems for two-stroke cycle engines, especially those finding larger power and more reliable performance requirements. Thus, there are various types of such expansion exhaust systems and it is not at all unusual to find teachings of precise and highly critical matching of an exhaust system with a two-stroke cycle engine; however, such prior matching of exhaust systems is fixed for specific engine operating parameters. Even slight variations in port timing or other variations due to engine modification and parts replacement will severely detune the system.

SUMMARY OF THE INVENTION

The present invention contemplates a tunable exhaust system for use with high quality, improved performance two-stroke cycle engines. In a more limited aspect, the invention consists of an exhaust expansion system which is variably tunable for use with two-stroke cycle motor-cycle engines of different size and horsepower. The exhaust system comprising a first means for leading exhaust gases into a second means which conducts the gases through a path of continually increasing cross-section, i.e. increasing volume per length, and into communication with an enlarged pulsation space. The opposite end of the pulsation space is baffled by a conical member which is adjustable along the axis of the exhaust system to vary the volume of the pulsation space and, therefore, the degree of resonance between reflected exhaust back pressure and exhaust pressure at the engine exhaust port.

Therefore, it is an object of the present invention to provide a relatively simple and inexpensive exhaust system which is tunable to enable maximum engine r.p.m. from a two-stroke cycle engine.

It is another object of the present invention to provide an expansion exhaust system which can be precisely adjusted to enable maximum engine horsepower for a preset carburetion.

It is a further object of this invention to provide a tunable exhaust mechanism which can materially decrease fuel waste.

Finally, it is an object of the present invention to provide an exhaust system for use with two-stroke cycle engine motorcycles which is easily adjusted to enable continual maintenance of the engine at maximum efficiency.

Other objects and advantages of the invention will be evident from the following detailed description when read in conjunction with the accompanying drawings which illustrate the invention.

DESCRIPTION OF THE INVENTION

Figure 1:
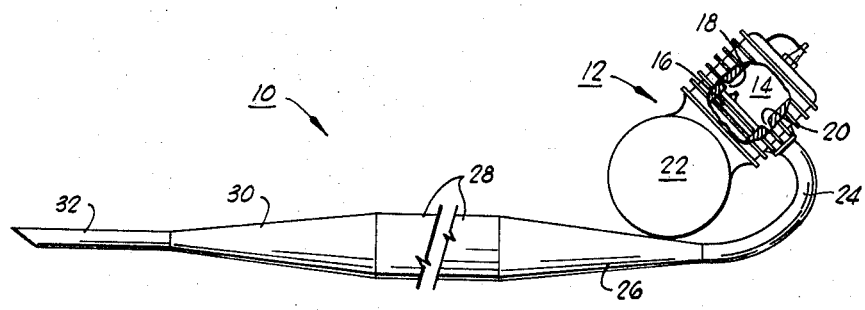
FIG. 1 illustrates a form of expansion chamber as utilized in conjunction with a two-stroke cycle engine.

FIG. 1 illustrates an expansion chamber 10 at is may be connected to the exhaust outlet of a conventional type of two-stroke cycle engine 12. The two-stroke cycle engine 12 may be any of the various types ranging from simple, one-cylinder appliance motors up to and including large, precision engines as employed in motorcycles, motor boats, etc. The basic operation of such two-stroke cycle engines is well known and the expansion chamber exhaust system 10 is coupled therewith to provide optimum exhaust control. Thus, the exhaust system 10 serves to return unburnt fuel particles which escape at the end of the exhaust stroke back into the cylinder of engine 12 thereby to increase cylinder pressure before the exhaust port is actually closed on the compression stroke.

The operation of any two-stroke cycle internal combustion engine is dependent for optimum performance upon the interrelationship of several variables, viz. piston port timing, fuel input valving, and porting of gases into and out of the explosion chamber or cylinder 14. This disclosure is concerned with the porting of gases in such manner as to provide optimum engine efficiency. That is, the beginning of the compression stroke finds the piston 16 drawn downward to such a position that fresh fuel or gas-air mixture is vented into the cylinder via inlet port 18 while, at the same time, exhaust gases are allowed to escape from the cylinder 14 into whatever the exhaust provision through an exhaust port 20. The efficient exhaust expansion system 10 serves to set up reflected pressure pulses within the exhaust system which arrive back at the cylinder port 20 at an optimum time after exhaust gases have passed into the exhaust system and in time to contain fresh gas-air fuel mixture within cylinder 14. Fresh fuel mixture (gas-air) is present in engine crankcase 22 and applied in conventional manner under periodic pressure up through inlet port 18 for entry into cylinder 14.

The exhaust system 10 is comprised of an inlet pipe 24 which leads down to the rearwardly flared megaphone portion 26 of exhaust system 10. The megaphone portion 26 then communicates in air-tight relationship with a central pulsation space 28 which may be constructed to be of various lengths depending upon specific engine operation criteria as will be further described below. The pulsation space 28 then communicates with the rearward baffle portion 30 which reflects some cases and conducts remaining outlet gases through a narrow tailpipe 32 to the exterior surrounds.

The critical part of the entire structure is the determination of what distance must exist between exhaust port 20 baffle portion 30 such that it will return a reflected exhaust gas pressure pulse at just the right moment to prevent a loss of fresh gas-air fuel mixture from cylinder 18 through exhaust port 20. A proper design length of exhaust system 10 will allow very precise cut-off between exhaust gas and gas-air fuel mixture just prior to closing of exhaust port 20 by upward travel of piston 14 in the compression stroke. The critical design can be made when it is known what the exhaust-open period is, and what the pressure pulse speed inside the exhaust system 10 will be. Isolation of such design data tends to defy exact computation; thus, it is usually necessary to combine certain ascertainable values with empirical results derived by trial and error, and then the resulting structure can only respond properly to a very narrow range of parameters such that small variations as to piston port timing and other minor adjustments will completely negate the beneficial effects.

Figure 2:
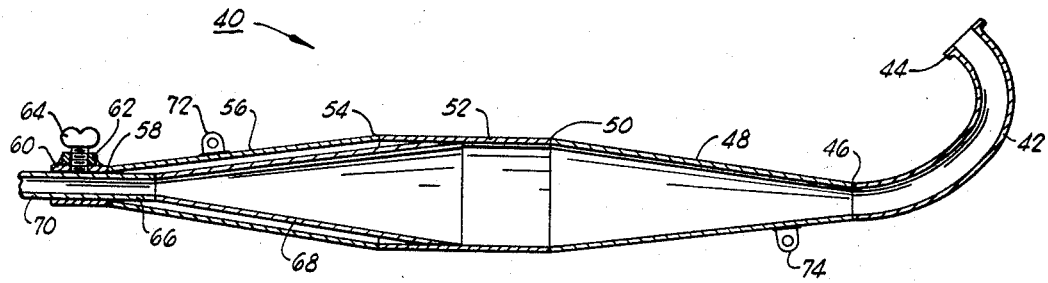
FIG. 2 is a vertical section of one form of the present invention.

FIG. 2 illustrates an adjustable expansion chamber 40 which provides the various beneficial effects; the expansion chamber 40 includes means for adjustment which enables it to be readily and simply adjusted for use with various two-stroke cycle engines thereby to maintain optimum fuel efficiency and power generation. Expansion chamber 40 is comprised of an inlet pipe 42, a uniform section of curved pipe which includes a flange 44 at the forward end to provide a securing surface to the two-stroke cycle engine. Flange 44 may be coupled in conventional manner by threaded fasteners with heat-resistant gasket means employed for sealing purposes. The curved pipe 42 is joined at a point 46 to a megaphone cone 48, a rearwardly flared conical pipe portion. The rearward end of megaphone cone 48 comes to a point 50 where it is connected in air-tight manner to a cylindrical section 52 which forms the pulsation volume, a variable length space as will be further described. A point 54 then denotes another juncture where cylindrical pipe 52 is sealingly joined to a rear cone 56, a forwardly flaring conical member.

Rear cone 56 at its narrow end 58 is then sealingly joined to a cylindrical securing member or pipe 60 which serves as a fastening support. Thus, securing pipe 60 carries a suitable nut 62 thereon as by welding and a wing screw 64 is threaded therethrough to provide securing engagement with an axially adjustable baffle member 66.

The baffle member 66 is comprised of a first forwardly flaring portion, a convergence cone 68, which extends rearwardly as a cylindrical second portion, a tailpipe section 70. The tailpipe section 70 is slidable within securing pipe 60 and the securing screw 64 can then be tightened to hold baffle member 66 or, more particularly, the convergence cone 68 at a predetermined spacing with respect to megaphone cone 48 and flange 44 at the exhaust port 20.

The material used in forming the various cone and cylinder portions of exhaust 40 may be selected from comparatively light and readily available materials, for example, twenty-two gauge mild steel has been used to good advantage. The various individual members may be attached together by a welding process, for example, the junctures such as seam or joint 50 between megaphone cone 48 and pulsation cylinder 52 may be joined by gas welding using mild steel rod. Other securing or attaching devices such as attaching lugs 72 and 74 may be welded at selected points on expansion chamber 40, the selection of points depending upon the size and model of motorcycle or other powered equipment employing the two-stroke cycle engine.

In operation, the employ of such as an adjustable expansion chamber 40 alleviates a major problem in maintaining efficient operation of two-stroke cycle engines; that is, it can provide the proper exhaust system for whatever the engine it is used with. The expansion chamber 40 can be adjusted to provide a return pulsation within the expansion chamber 40 which returns back to the cylinder 18 that portion of fresh charge (gas-air) which may flow outward from the cylinder 18 through port 20 and into the exhaust inlet pipe 42. This fresh charge can be forced back into the cylinder 18 by a reflected pressure wave caused by burnt charges striking the convergence cone 68 and being reflected back toward the engine cylinder 14. The efficiency of such charge regulation in the cylinder 18, i.e. charge differentiation at port 20, is directly dependent upon the interval or distance from the convergence cone 68 back to the engine or exhaust port 20. This is easily and directly adjusted by axial positioning of tailpipe 70 within supporting cylinders 60 and the tightening of securing screw 64. The reflected charge within expansion chamber 40 may be precisely controlled in accordance with the other factors involved, i.e. engine r.p.m.'s, piston port timing, carburation, and other extraneous factors which may be affected in the precision tuning, for example, the tuning of an engine for racing purposes.

Expansion chamber 40 serves to maintain all unburned gases in the cylinder 18 thereby to increase cylinder pressure before exhaust port 20 closes as piston 14 moves upward. Even the more inexperienced operators are capable of arriving at a precise tuning by simply adjusting the baffle member 66 to place convergence cone 68 in a longitudinal position which causes the engine to operate best. An indication of best operation may be given in various ways, for example, simple speedometer readings, engine r.p.m. indication, or an experienced operator may achieve very good results simply by engine sound comparisons.

Figure 3:
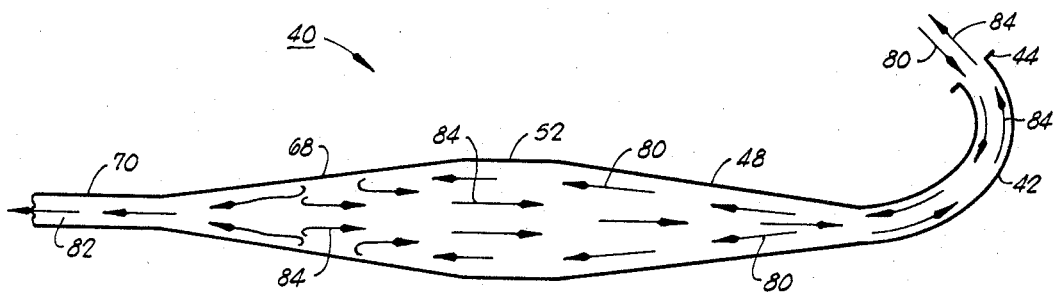
FIG. 3 is a functional diagram of the present invention.

FIG. 3 depicts in generalized form the manner in which exhaust gases are deflected at an optimum time to regulate charge pressure within cylinder 18. Thus, exhaust gas input from exhaust port 20 is depicted as arrow 80 which traverses through inlet pipe 42 into expansion chamber 40. Exhaust gases 80 are then passed through megaphone cone 48 whereupon they undergo expansion through pressure-reduction and then passage into the central section or pulsation cylinder 52. The exhaust gases 80 then experience a pressure increase as they pass into convergence cone 68 whereupon a portion of exhaust gases 80 pass out through tailpipe 70 as expelled gases 82, and the remaining gas is reflected as return gases 84, a generally well-defined pressure wave which traverses back through cylinder 52 and undergoes pressure-reduction through megaphone 48 for traverse back up through inlet pipe 42. Proper adjustment of convergence cone 68 and, therefore, the length of expansion chamber will cause the reflected pressure wave front of return gases 84 to arrive at the engine exhaust port 20 at an optimum time which compresses the maximum amount of unburned gas-air charges into cylinder 18 for the next ensuing compression and ignition functions.

Empirical results dictate certain dimensions which should be generally adhered to in order to insure optimum resonance qualities of the expansion chamber. It has been found preferable to construct the megaphone cone 48 to be slightly longer than the convergence cone 68, an approximate ratio of four to three being suitable. The length of pulsation cylinder 52 should be long enough that good pulsation or resonance qualities are enabled and sufficient variation in length is available. For example, in one form of the invention as constructed, an inlet pipe 42 having a diameter of 1.75 inches operates into a megaphone cone 48 which is 12.5 inches long, followed by a 7 inch pulsation section 52 of 3.5 inches diameter. A convergence cone 68 of 9 inches length is reciprocally maintained within pulsation cylinder 52. It also appears from empirical results that the diameter of tailpipe 70 should be slightly less than the diameter of inlet pipe 42, on the order of a ratio of 1 to 1.25 inches. The actual length of the curved inlet pipe 42 will vary from 9 to 12 inches, and generally speaking, the more radical the engine, the shorter the length.

The foregoing discloses a novel adjustable expansion chamber exhaust system for use on two-stroke cycle engines which enables the relatively unskilled operator to tune the engine quickly and reliably for optimum performance. Employ of the adjustable expansion chamber enables tuning for maximum engine horsepower as well as for optimum performance at specific r.p.m. readings with consequent improvement in fuel consumption and efficiency. While specific materials are mentioned herein, it should be understood that there is little limitation on such so long as shock and heat requirements are met. It should also be understood that due to the inherent nature of the operation, its being integral with an associated cylinder, an expansion chamber is required for each single cylinder in order to render best performance and properly carry out the intended function.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. An exhaust expansion chamber for utilization at the exhaust port of a two-stroke cycle engine, comprising:
   first means defining a uniform diameter first chamber and being connected to said exhaust port;
   second means defining a uniformly flared second chamber having a larger end and a smaller end which is connected in communication with said first chamber as said first and second means are rigidly secured;
   third means defining a uniform third chamber which is in communication with said second chamber larger end as said second and third means are rigidly secured;
   fourth means defining a uniformly flared fourth chamber having a smaller end in communication with the exterior and a larger end connected in communication with said third chamber as said fourth means is adjustably secured to said third means to provide adjustment of the volume of said third chamber.

2. An exhaust expansion chamber as set forth in claim 1 which is further characterized in that said second means is generally conical and has an angle of flare of approximately five degrees and said fourth means is generally conical with an angle of flare of greater than said approximately five degrees.

3. An exhaust expansion chamber as set forth in claim 1 which is further characterized in that said first means diameter is larger than said fourth means smaller end by a ratio of approximately 1.75 to 1.

4. An exhaust expansion chamber as set forth in claim 1 which is further characterized in that said second means is longer end-to-end than said fourth means by a ratio of approximately 4 to 3.

5. An exhaust expansion chamber as set forth in claim 1 which is further characterized to include:
   fifth means including a securing cylinder rigidly secured to said third means and receiving said fourth means smaller end in adjustable affixure through said securing cylinder while rigidly positioning said fourth means larger end within said third means.

6. An exhaust expansion chamber for utilization at the exhaust port of a two-stroke cycle engine; comprising:
   inlet pipe means having first and second ends and including a connection element for sealingly securing the first end of the inlet pipe means to said engine exhaust port;
   first pipe means having first and second ends and being generally, uniformly flared progressing from said first pipe means first end to the first pipe means second end, said first pipe means first end being connected to said inlet pipe means second end and forming an air-tight passage therethrough;
   second pipe means having first and second ends and generally first end being connected to said first pipe means second end and forming an air-tight passage therethrough;
   third pipe means having first and second ends and being generally, uniformly flared progressing from said third pipe means second end to said third pipe means first end, said third pipe means first end being connected to said second pipe means second end and forming an air-tight passage therethrough;
   fourth pipe means formed as a generally, uniformly flared first portion terminating at an enlarged first end and integrally extending as a reduced, uniform cross-section second portion terminating at a second end, said fourth pipe means first portion being movably disposed within said third pipe means and said fourth pipe means second portion extending through the third pipe means second end; and
   adjustment means for rigidly securing said fourth pipe means within said third pipe means to form an exhaust chamber of predetermined volume and internal shape within said first, second and fourth pipe means.

7. An exhaust expansion chamber as set forth in claim 6 which is further characterized in that said first pipe means is longer end-to-end than said third pipe means by a ratio of approximately 4 to 3.

8. An exhaust expansion chamber as set forth in claim 6 which is further characterized in that said inlet pipe means has a diameter which is larger than the diameter of said fourth pipe means second portion by a ratio of approximately 1.75 to 1.

References Cited
UNITED STATES PATENTS

| | | | |
|---|---|---|---|
| 1,229,471 | 6/1917 | Jones et al. | 60—32 |
| 1,804,321 | 5/1931 | Crowe | 60—32 |
| 1,834,473 | 12/1931 | Ricardo | 60—32 |
| 1,860,569 | 5/1932 | Bourne. | |
| 2,102,559 | 12/1937 | Kadenacy | 123—65 XR |
| 3,254,484 | 6/1966 | Kopper. | |
| 3,367,311 | 2/1968 | Tenney | 60—32 |

WENDELL E. BURNS, *Primary Examiner.*

U.S. Cl. X.R.
123—65; 181—64